United States Patent
Matzkovits

(10) Patent No.: US 9,476,688 B2
(45) Date of Patent: Oct. 25, 2016

(54) COORDINATE MEASURING APPARATUS FOR MEASURING A WORKPIECE

(71) Applicant: Carl Zeiss Industrielle Messtechnik GmbH, Oberkochen (DE)

(72) Inventor: Berthold Matzkovits, Gerstetten (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 353 days.

(21) Appl. No.: 14/171,533

(22) Filed: Feb. 3, 2014

(65) Prior Publication Data

US 2014/0144032 A1    May 29, 2014

Related U.S. Application Data

(63) Continuation of application No. PCT/EP2011/063384, filed on Aug. 3, 2011.

(51) Int. Cl.
    *G01B 5/008*    (2006.01)
    *G01B 5/00*    (2006.01)

(52) U.S. Cl.
    CPC .............. *G01B 5/008* (2013.01); *G01B 5/0014* (2013.01)

(58) Field of Classification Search
    CPC ...................................................... G01B 5/008
    USPC .................................................. 33/503, 1 M
    See application file for complete search history.

(56) References Cited

U.S. PATENT DOCUMENTS

| | | | |
|---|---|---|---|
| 3,434,218 A * | 3/1969 | Potter ................. | G01B 11/002 33/1 R |
| 3,639,993 A | 2/1972 | Sartorio | |
| 3,785,743 A | 1/1974 | Sartorio | |
| 4,621,926 A * | 11/1986 | Merry ................ | G01B 11/005 33/503 |
| 4,631,834 A * | 12/1986 | Hayashi ............... | G01B 5/008 33/1 M |
| 4,910,446 A * | 3/1990 | McMurtry ............ | G01B 5/008 318/560 |

(Continued)

FOREIGN PATENT DOCUMENTS

DE     200 12 469 U1     10/2000
EP     1 335 180 A2     8/2003

OTHER PUBLICATIONS

English translation and Written Opinion dated Apr. 17, 2012 of international application PCT/EP2011/063384 on which this application is based.

(Continued)

*Primary Examiner* — Christopher Fulton
(74) *Attorney, Agent, or Firm* — Walter Ottesen, P.A.

(57) ABSTRACT

A coordinate measuring apparatus for measuring a workpiece having a workpiece surface includes a sensor to capture the workpiece surface and a mechanism to move the sensor in coordinate directions (x, y, z) relative to the workpiece. The mechanism includes a rigid frame, a mount and measuring skids. The rigid frame includes mutually parallel horizontal longitudinal members having respective horizontal guides. The rigid frame includes vertical supports having respective upper and lower ends. The horizontal longitudinal members are rigidly connected to the upper ends of the vertical supports. The rigid frame includes transverse members oriented transverse to the longitudinal members and being rigidly connected to the lower end of the vertical supports. The transverse members are supported via the mount and a first one of the measuring skids is configured to move the sensor in the coordinate direction (x) along the first and second horizontal guides.

17 Claims, 11 Drawing Sheets

(56) References Cited

U.S. PATENT DOCUMENTS

| | | | | |
|---|---|---|---|---|
| 5,173,613 A | * | 12/1992 | Henry | B23Q 1/03 250/559.19 |
| 5,287,629 A | * | 2/1994 | Pettersson | G01B 5/008 33/1 M |
| 6,161,079 A | * | 12/2000 | Zink | G01B 21/04 33/503 |
| 6,161,298 A | | 12/2000 | Bernhardt et al. | |
| 6,829,838 B1 | | 12/2004 | Weekers et al. | |
| 7,644,507 B2 | * | 1/2010 | Fuchs | G01B 5/008 33/503 |
| 8,973,279 B2 | * | 3/2015 | Singh | G01B 5/008 33/502 |
| 2008/0228441 A1 | * | 9/2008 | Lugtenburg | G01B 21/20 702/167 |
| 2010/0083517 A1 | | 4/2010 | Guasco | |
| 2015/0131697 A1 | * | 5/2015 | Sakai | G01B 21/045 374/56 |

OTHER PUBLICATIONS

International preliminary report on patentability dated Feb. 6, 2014 of international application PCT/EP2011/063384 on which this application is based.

International Search Report dated Apr. 17, 2012 of international application PCT/EP2011/063384 on which this application is based.

* cited by examiner

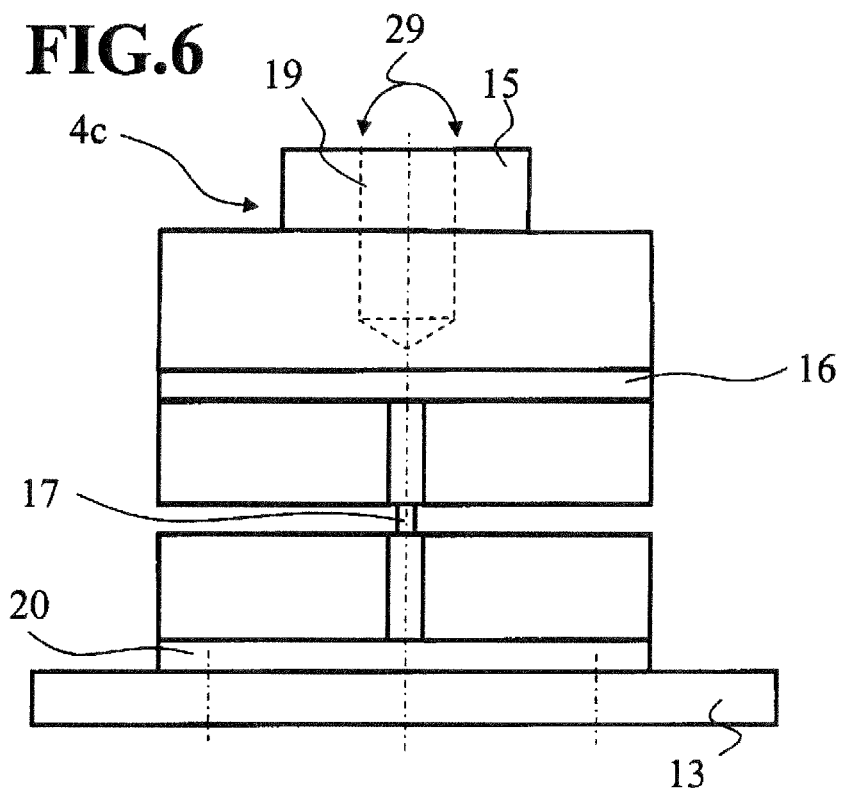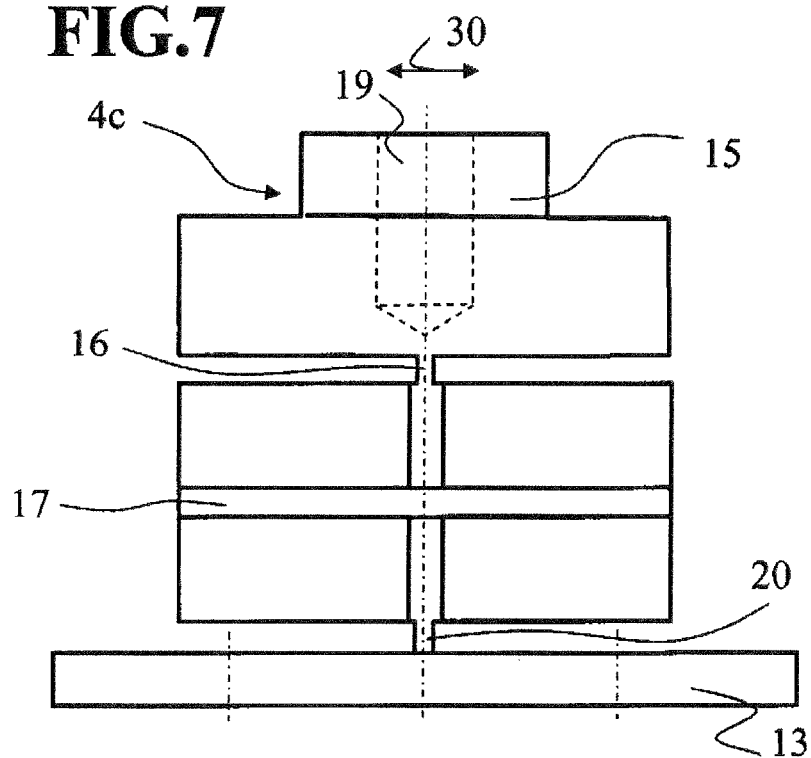

COORDINATE MEASURING APPARATUS FOR MEASURING A WORKPIECE

CROSS REFERENCE TO RELATED APPLICATIONS

This application is a continuation application of international patent application PCT/EP2011/063384, filed Aug. 3, 2011, designating the United States, and the entire content of this application is incorporated herein by reference.

FIELD OF THE INVENTION

The invention relates to a coordinate measuring apparatus for measuring a workpiece. The apparatus includes:
a) a sensor for detecting the workpiece surface of the workpiece,
b) a mechanism for moving the sensor relative to the workpiece in one or more coordinate directions (x, y, z), wherein the mechanism, in turn, includes the following:
   a first horizontal longitudinal member with a first horizontal guide,
   a second horizontal longitudinal member with a second horizontal guide which is oriented parallel to and spaced apart from the first horizontal guide,
   at least one first vertical support and a second vertical support, wherein the first horizontal longitudinal member is connected to the upper end of the first vertical support and to the upper end of the second vertical support,
   at least one third vertical support and a fourth vertical support, wherein the second horizontal longitudinal member is connected to the upper end of the third vertical support and to the upper end of the fourth vertical support,
   a first measuring slide for moving the sensor in a first horizontal coordinate direction, which measuring slide is guided along the first horizontal guide and the second horizontal guide.

BACKGROUND OF THE INVENTION

A coordinate measuring apparatus of the kind described above has already been known for a relatively long time from the prior art.

For example, U.S. Pat. No. 3,639,993 presents a coordinate measuring apparatus of this type, which is frequently referred to as a bridge-type measuring device. The patent presents a coordinate measuring apparatus in which two horizontal longitudinal members are provided with horizontal guides which are parallel to each other and are each mounted via three vertical supports directly on the factory building floor located therebelow. A bridge slide is guided movably along the horizontal guides in a first coordinate direction. A cross slide is guided movably on the bridge slide in a second horizontal coordinate direction, the cross slide, in turn, movably guiding a spindle sleeve in the third coordinate direction, that is, in the vertical direction. A sensor via which the workpiece can be detected is fastened to the lower end of the spindle sleeve. In order to mount the workpiece, a workpiece table is provided between the guides which are oriented parallel to one another, the workpiece table being mounted on the factory building floor independently of the guides.

Coordinate measuring apparatuses of this type are often used in manufacturing environments and are particularly suitable for receiving large workpieces. The workpieces can be transported in a simple manner onto the front side of the workpiece table, for example with a crane or with a forklift truck. However, the workpiece table is also readily accessible laterally because of the raised guides and the vertical supports lying relatively far apart.

However, it is then problematic if the floor is deformed. Such a deformation can take place, for example, due to sinking of the substructure or due to heavy workpieces. This results in the mechanism of the coordinate measuring apparatus being deformed and considerable measurement errors occurring by this means.

Another coordinate measuring apparatus with a similar construction is known from U.S. Pat. No. 6,161,298. The patent presents a coordinate measuring apparatus in which two horizontal longitudinal members are likewise provided with horizontal guides which are parallel to each other and are each mounted via two vertical supports on a rectangular frame, wherein the frame, in turn, is mounted on the floor via vibration dampers. Each of the supports is mounted at the lower end tiltably on the frame and at the upper end is screwed to one of the longitudinal supports and, in addition, is stiffly connected in one or more directions via a connector to a concrete polymer body. The concrete polymer body here surrounds both the rectangular frame and the supports. So that the supports remain movable in relation to the concrete polymer body, tubes in which the supports run are cast in the concrete polymer body. A bridge slide is guided movably along the horizontal guides in a first coordinate direction. A cross slide is guided movably on the bridge slide in a second horizontal coordinate direction, the cross slide, in turn, movably guiding a spindle sleeve in the third coordinate direction, that is, in the vertical direction. A sensor via which the workpiece can be detected is fastened to the lower end of the spindle sleeve. For the mounting of the workpiece, a measuring table is mounted on the rectangular frame.

European publication 1335180 A2 discloses a coordinate measuring apparatus which is clearly very similarly constructed to the coordinate measuring apparatus according to U.S. Pat. No. 6,161,298. It is not described in detail therein how the vertical supports, on which the longitudinal members with the guides are fastened, precisely rest on the rectangular frame and how the supports are specifically cast in the concrete polymer and fastened thereto, since this is not the actual subject matter of the patent application. However, from the obvious correspondence of FIG. 4 of this document with FIG. 1 of U.S. Pat. No. 6,161,298, it is apparent that the same type of coordinate measuring apparatus is clearly involved here. Unlike in U.S. Pat. No. 6,161,298, in European publication 1335180 A2 the measuring table is not mounted on the rectangular frame. On the contrary, both the rectangular frame and the measuring table are mounted on four jointly used supporting elements. Warping of the coordinate measuring apparatus as a consequence of a high workpiece weight can thereby be avoided.

The coordinate measuring apparatuses presented in U.S. Pat. No. 6,161,298 and European publication 1335180 A2 have proven successful in the past. However, they are suitable only for relatively small workpieces. An enlargement of the coordinate measuring apparatuses to greater measuring volumes, with which even large workpieces can then be measured, is not readily possible. One of the reasons is that the concrete polymer body to be used would then be very large and also heavy and is therefore difficult to transport. In addition, when the coordinate measuring apparatus is enlarged, the problem would also arise that, in the event of a deformation of the floor, the loadings in the vibration dampers or supporting elements could change, causing the mechanism of the coordinate measuring apparatus to be deformed and considerable measurement errors to occur as a result.

SUMMARY OF THE INVENTION

Starting from this prior art, it is an object of the invention to provide a coordinate measuring apparatus of the type referred to above wherein the coordinate measuring apparatus is suitable in particular for large workpieces and wherein the accuracy is not influenced by deformation of the floor.

A special characteristic of the coordinate measuring apparatus of the invention can be considered that of the mechanism, which is provided for moving the sensor in one or more coordinate directions relative to the workpiece, having a stiff frame which includes the following:
- a first horizontal longitudinal member with a first horizontal guide,
- a second horizontal longitudinal member with a second horizontal guide which is oriented parallel to and spaced apart from the first horizontal guide,
- at least one first vertical support and a second vertical support, wherein the first horizontal longitudinal member is connected stiffly to the upper end of the first vertical support and to the upper end of the second vertical support,
- at least one third vertical support and a fourth vertical support, wherein the second horizontal longitudinal member is connected stiffly to the upper end of the third vertical support and to the upper end of the fourth vertical support,
- a first cross member which is oriented transversely with respect to the longitudinal direction of the first longitudinal member and of the second longitudinal member and to which the lower end of the first support and the lower end of the third support are stiffly connected,
- a second cross member which is oriented transversely with respect to the longitudinal direction of the first longitudinal member and of the second longitudinal member and to which the lower end of the second support and the lower end of the fourth support are stiffly connected.

A stiff frame which is constructed in such a manner and in which the longitudinal members, the vertical supports and the cross members are stiffly connected to one another in the described manner has considerable advantages.

Although, by this means, firstly a coordinate measuring apparatus is created, the coordinate measuring apparatus being suitable for relatively large workpieces, such as, for example, car bodies, the advantage that the position of the horizontal guides is determined fairly accurately can thereby nevertheless be used. Since, namely, the frame can be manufactured very accurately, adjustment problems, as occur in the case of coordinate measuring apparatuses in which each vertical support has to be fastened separately, for example via dowels, on the floor, can thereby be avoided from the outset. Nevertheless, the frame can be transported in a highly space-saving manner to the customer by being dismantled into its individual parts (longitudinal member, cross members and the supports) and then being transported in dismantled form. The frame is then only assembled when at the customer, for example by the components being screwed together.

Such a frame also ensures a very high level of stiffness. The term "stiff" should be understood in conjunction with the stiff frame as meaning that the frame in its entirety is stiff in relation to forces, bending moments and torsional moments. This is firstly achieved by a sufficiently stiff configuration of the components of the stiff frame, that is, of the longitudinal members, the supports and the cross members. Secondly, this is achieved by sufficiently stiff connections between the components, that is, by a stiff connection between support and cross member and between support and longitudinal member. Owing to the high level of stiffness of the frame, deformations of the floor cause only substantially smaller deformations of the guides.

In addition, very good accessibility from the front sides of the coordinate measuring apparatus and from the sides is provided.

The mechanism of the coordinate measuring apparatus of the invention also includes a mounting via which the first cross member of the stiff frame described above and the second cross member of the stiff frame described above are mounted.

In addition, the mechanism of the coordinate measuring apparatus of the invention includes at least one first measuring slide for moving the sensor in a first horizontal coordinate direction, wherein the measuring slide is guided along the first horizontal guide and the second horizontal guide of the stiff frame described.

In addition to the mechanism of the coordinate measuring apparatus, the coordinate measuring apparatus of the invention also includes a sensor which can be moved in at least one coordinate direction by the mechanism. The sensor is provided for detecting the workpiece surface of a workpiece and can be configured in very different ways. For example, the sensor can be configured to be tactile or optical. As a tactile sensor, use can be made, for example, of what is referred to as a switching sensor which, on contact of a workpiece with its shaped sensing body, generates a signal, or a measuring sensor, the shaped sensing body of which, on contact with the workpiece, can be deflected in the three coordinate directions, and the deflection is detected by measuring systems and taken into consideration during the measurement. As an optical sensor, use can be made, for example, of a digital camera or a laser triangulation sensor.

With regard to the mounting, a multiplicity of measures can be undertaken in order further to reduce the effects of the floor deformations (for example as a consequence of vibrations) already discussed above.

On account of the size of the coordinate measuring apparatus, the mounting should include three or more underpinnings via which the cross members are mounted on a frame seat, in particular on a frame seat which is substantially stiff. The frame seat may involve different forms. For example, in the simplest case, the floor itself can be used as the frame seat, with the cross members then being mounted on the floor via the underpinnings. Alternatively, use can be made of a separate substructure which then, for its part, is in turn mounted on the floor. Instead of a substructure, use can also be made of a framework, such as, for example, a steel structure.

A further reduction in effects of deformations of the floor can be achieved if, of the underpinnings of the mounting, precisely three underpinnings are stiff in the vertical direction, wherein the first cross member of the frame is mounted on a first underpinning of the three underpinnings, and the second cross member of the frame is mounted on a second underpinning and on a third underpinning of the three underpinnings.

This realizes a three-point mounting. If no further underpinnings are provided apart from the three underpinnings which are stiff in the vertical direction, it is ensured that all three underpinnings always rest on the frame seat and therefore the weight acting on the respective underpinning remains constant. Deformations, elevations or lowerings of the frame seat, as may occur, for example, due to local sinking of the floor or as may occur due to vibrations of the floor, therefore do not result in a change in the weights absorbed by the three underpinnings and consequently also not in deformations of the stiff frame.

Unlike the stiff frame which is mounted on the frame seat via a mounting which includes three underpinnings which are stiff in the vertical direction, the frame seat itself, by contrast, can be mounted resiliently and/or in a vibration-damped manner on the floor. If the frame seat is a substructure or a framework, the frame seat can be mounted on the floor via underpinnings which are resilient in the vertical direction and/or horizontal direction and are optionally vibration-damping underpinnings, that is, for example, via resilient plates (for example, produced from rubber and cork), via spiral springs (optionally additionally with vibration dampers) or via leaf springs.

With regard to the underpinnings, which are stiff in the vertical direction, of the three-point mounting of the stiff frame, at least one underpinning in this case can be configured in such a manner that the underpinning is movable in a horizontal direction or else in both of the two horizontal directions which are perpendicular to each other. In particular, the relevant underpinning, which is stiff in the vertical direction, of the three-point mounting can be linearly movable in at least one horizontal direction (x) and/or can be tiltable in at least one horizontal direction. If the underpinning, which is stiff in the vertical direction, is linearly movable in a horizontal direction, thermal length changes of the stiff frame or else thermally induced length changes of the frame seat on which the stiff frame is mounted can thereby be compensated for in the relevant horizontal direction. If the underpinning is tiltable in a horizontal direction, for example distortions of the frame seat can be compensated for by the relevant underpinning in the relevant horizontal direction.

Such an underpinning, which is stiff in the vertical direction, of the three-point mounting can be produced monolithically from a block of material, wherein the movability in the horizontal direction is achieved by material weakenings of the block of material, for example by milled portions.

In addition to the three underpinnings which are stiff in the vertical direction, it is also possible, should this be necessary, to provide one or more underpinnings which are resilient in the vertical direction, without substantially reducing the advantages described in more detail above of a three-point mounting with three underpinnings which are stiff in the vertical direction. This may be necessary, for example, whenever the requirements regarding the length of the longitudinal members are such that two supports are no longer sufficient, and therefore the relevant longitudinal member has to be supported by one or more additional supports which then, in turn, rest on a cross member.

In the case of a coordinate measuring apparatus in which then, in addition to the support, each of the two longitudinal members in each case requires at least one additional vertical support, the frame of the mechanism of the coordinate measuring apparatus then additionally includes the following:

a fifth vertical support, to the upper end of which the first horizontal longitudinal member is stiffly connected, a sixth vertical support, to the upper end of which the second horizontal longitudinal member is stiffly connected, a third cross member which is oriented transversely with respect to the longitudinal direction of the first longitudinal member and of the second longitudinal member and to which the lower end of the fifth support and the lower end of the sixth support are stiffly connected.

In addition, the mounting of the mechanism then has at least one underpinning which is resilient in the vertical direction and via which the third cross member is mounted.

In precisely the same manner as the three underpinnings which are stiff in the vertical direction, the third cross member should then be mounted on the frame seat via the underpinning which is resilient in the vertical direction. A spring with a very soft characteristic should be used as the spring for the resilient underpinning. Suitable springs for this purpose include spiral springs, leaf springs or pneumatic springs.

A further special characteristic can be considered that of being able to provide a workpiece seat on which the workpiece to be measured can be mounted, wherein the workpiece seat is designed in such a manner that the force flux of the weight of the workpiece is introduced directly into the frame seat. The workpiece seat is therefore in particular not mounted on components of the stiff frame, but rather directly on the frame seat. This affords the further advantage that in particular high workpiece weights cannot result in deformation of the mechanism. High workpiece weights can indeed result in deformation of the frame seat itself. However, the effect achieved by the stiff frame, which has already been described above, and the three-point mounting of the stiff frame via underpinnings which are stiff in the vertical direction is that only the position of the mechanism changes by this means. This is, however, completely unproblematic because this has the same effect as a workpiece clamped askew. By contrast, warping of the mechanism, which would result in measurement errors, can be avoided.

The configuration of the workpiece seat on which the workpiece which is to be measured can be mounted may be completely different.

In the simplest case, the floor itself can be the workpiece seat, the floor at the same time then also being the frame seat.

However, as an alternative, the workpiece seat can also be formed by a workpiece table which is mounted on the frame seat. The mounting of the workpiece table on the frame seat can be different depending on the frame seat provided. If the frame seat is the floor itself or a substructure or a framework, then, precisely as for the stiff frame, a three-point mounting with three underpinnings which are stiff in the vertical direction could preferably be used for the workpiece table. This would ensure that the workpiece table takes up an unambiguous position in relation to the frame seat. In addition, further underpinnings can also be provided, the underpinnings then preferably being of resilient design in the vertical direction. As an alternative, however, unlike in the event of the stiff frame, the further underpinnings can also be stiff in the vertical direction. The background thereto is as follows. Whereas a deformation of the stiff frame results in a deformation of the guides of the measuring slides and therefore causes measurement inaccuracies, a deformation of the workpiece table acts only on the position of the workpiece, but not on the accuracy with which the workpiece is measured.

If a framework is used as the frame seat, the measuring table could, however, also be an integral part of the framework. For example, the frame seat and the measuring table could be designed as a welded steel structure.

In one configuration, the first measuring slide supports a second measuring slide in a manner movable horizontally along the first measuring slide in a second horizontal coordinate direction (y), wherein the second measuring slide, in turn, movably supports a third measuring slide, to the lower end of which the sensor is fastened, in a third vertical coordinate direction (z). By this means, the sensor can then be moved in all three coordinate directions (x, y and z).

The structural elements of the stiff frame can vary in diverse ways. For example, the vertical supports and/or the horizontal longitudinal members and/or the cross members can be produced from granite, or can be produced from a cast part or can be produced as a stiff lattice work, in which, in a manner similar to a high-voltage mast, metal profiles are screwed or welded together to form a stiff structural element.

However, the horizontal longitudinal members and/or the vertical supports and/or the cross members can be designed in a particularly simple manner as a hollow profile. Such a hollow profile can be produced in a simple manner from two U-shaped halves welded together lengthwise. The U-shaped halves can be formed, for example, by bent steel plates.

The stiff connection between the vertical supports and the cross members and/or the stiff connection between the vertical supports and the horizontal longitudinal members is advantageously a screw connection or a welded connection.

With regard to the construction of the coordinate measuring apparatus, it is expedient, in particular in the case of large coordinate measuring apparatuses, to arrange the cross members in one or more recesses in the floor. This is because, by this means, a coordinate measuring apparatus which is level with the floor and can be walked or traveled over from all sides can then be realized. In order to realize this, in the simplest case, cuboidal recesses can be provided specifically for the cross members in the floor, with the cross members being arranged in the recesses. The floor itself then serves as a workpiece seat and at the same time as a frame seat. The recesses should be covered with corresponding plates in the region of the cross members. Alternatively, however, a large recess can be provided in the floor, with the frame seat (for example a substructure or a framework) in addition to the cross members, which are mounted thereon, of the stiff frame and a workpiece table serving as the workpiece seat then being arranged in the recess. The workpiece table then has to be configured in such a manner that the upper side thereof lies in the same plane as the floor. The intermediate spaces between the workpiece table and the edges of the recess in the floor should be covered with plates.

BRIEF DESCRIPTION OF THE DRAWINGS

The invention will now be described with reference to the drawings wherein:

FIG. 6 shows a front view of the underpinning 4c which is shown in FIG. 5 and is stiff in the vertical direction;

FIG. 7 shows a side view of the underpinning 4c which is shown in FIG. 5 and is stiff in the vertical direction;

DESCRIPTION OF THE PREFERRED
EMBODIMENTS OF THE INVENTION

Figure 1:
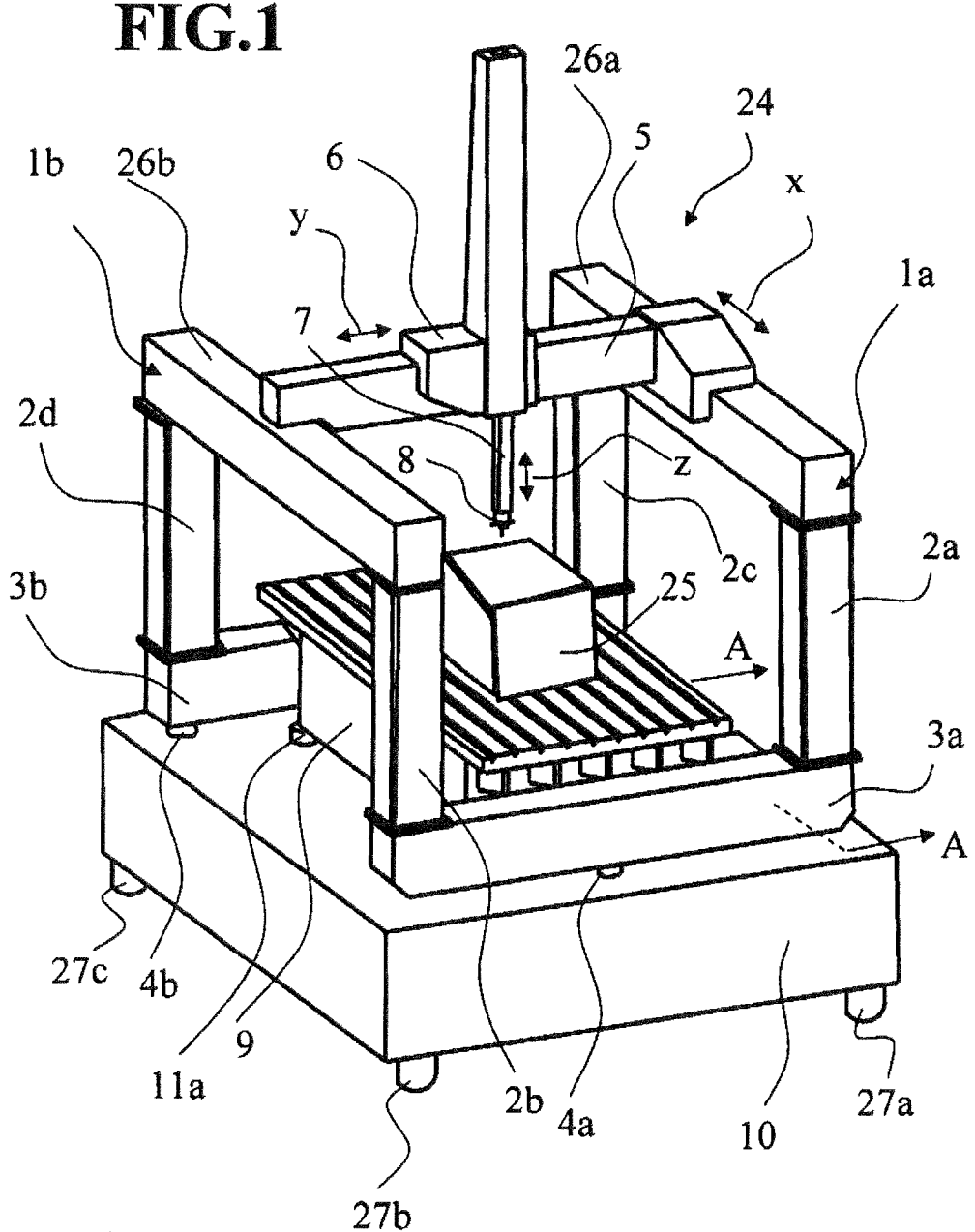
FIG. 1 shows the construction of a coordinate measuring apparatus according to the invention.
Figure 2:
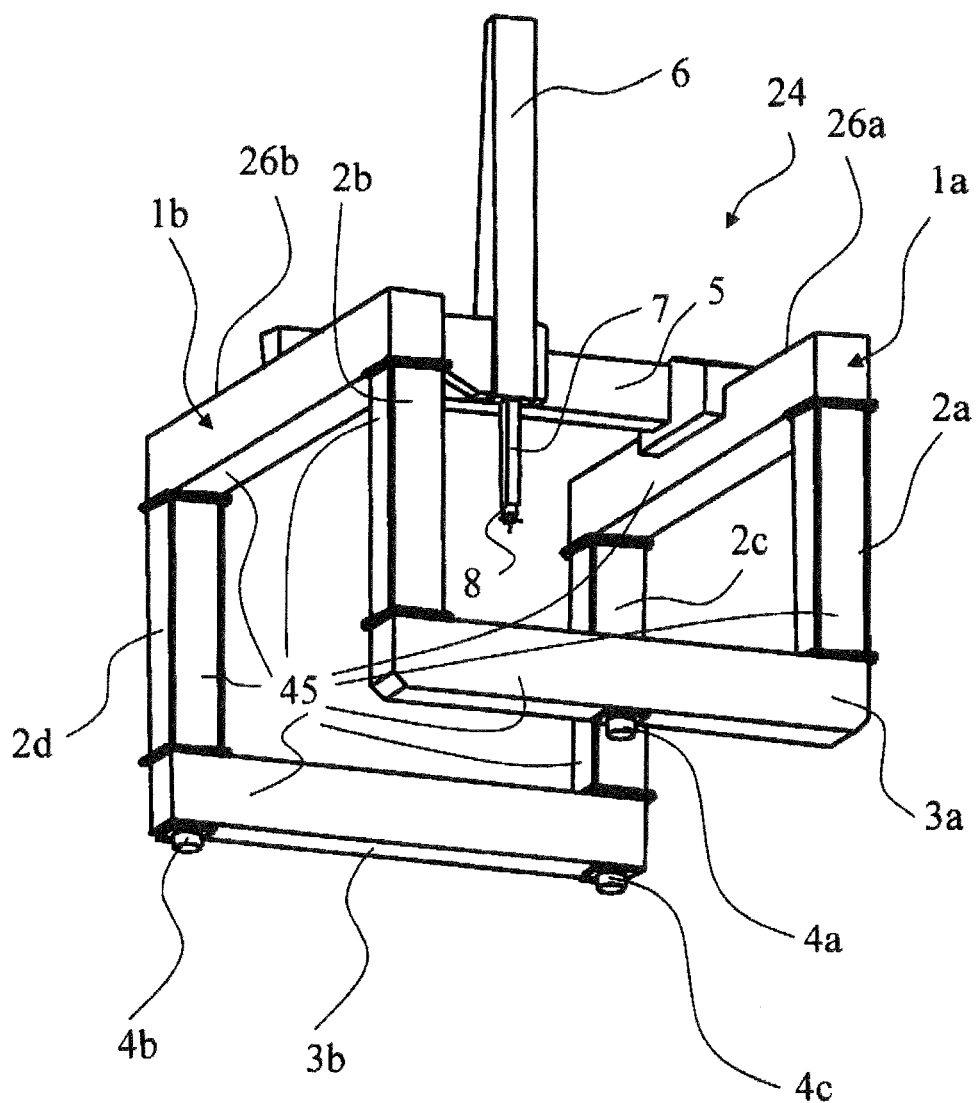
FIG. 2 shows a perspective view of the mechanism 24 for moving the sensor 8 out of the coordinate measuring apparatus shown in FIG. 1.

FIG. 1 shows, purely by way of example, a coordinate measuring apparatus, in which the invention is realized. FIG. 2 here shows some of the components which can be seen in FIG. 1, namely the mechanism 24, which is described in detail further below, in addition to the sensor 8 which is fastened thereto, in a perspective view laterally from below.

A coordinate measuring apparatus according to the invention will now be explained in more detail with reference to FIGS. 1 and 2, wherein the designations used in the claims that correspond to expressions used in conjunction with the description of the drawings, if required, are placed between parentheses after the expressions. In order to measure a workpiece 25 which is mounted here on a workpiece table 9, a sensor 8 can be moved relative to the workpiece 25 in the three coordinate directions x, y and z which are perpendicular to one another by means of a mechanism 24. The respective coordinate directions in this case are illustrated by arrows x, y and z. The sensor 8 here can be configured, for example, so as to be tactile or optical. As a tactile sensor, use can be made, for example, of what is referred to as a switching sensor which, on contact with a workpiece 25 with its shaped sensing body, generates a signal, or a measuring sensor, the shaped sensing body of which, on contact with the workpiece 25, can be deflected in the three coordinate directions x, y and z, and this deflection is detected by measuring systems and is taken into consideration in the measurement. As the optical sensor, use can be made, for example, of a digital camera or a laser triangulation sensor.

The sensor 8 is fastened to a spindle 7 (third measuring skid) which is mounted movably in the vertical direction, denoted by the arrow z, on a corresponding cross side 6

(second measuring skid). The vertical position of the spindle 7 (third measuring skid) is determined via a scale which cannot be seen specifically. The spindle 7 (third measuring skid) can be moved in the vertical z direction via a drive which can likewise not be seen. The cross slide 6 (second measuring skid), in turn, is movable on a bridge slide 5 (first measuring skid) in the horizontal direction which is denoted by the arrow y and which is perpendicular to the z direction. A scale for determining the position of the cross slide 6 (second measuring skid) in the direction denoted by the arrow y is also provided for this purpose, as is a drive via which the cross slide 6 (second measuring skid) can be driven. The bridge slide 5 (first measuring skid), in turn, is mounted movably on two parallel, horizontally oriented guides 26a and 26b (first horizontal guide 26a and second horizontal guide 26b) in the coordinate direction denoted by the arrow x. The guide 26a (first horizontal guide) is part of a horizontal longitudinal member 1a (first horizontal longitudinal member) and the guide 26b (second horizontal guide) is part of a horizontal longitudinal member 1b (second horizontal longitudinal member). For this purpose, the guides have been designed here as air underpinning guides, wherein the guide surfaces of the guides 26a and 26b are incorporated here directly into the longitudinal members 1a and 1b and on which air underpinnings fastened to the bridge slide 5 are guided movably. Of course, other guides are also possible, such as, for example, linear guides, in which circulating ball shoes are guided on rails.

The bridge slide 5 (first measuring slide) is also provided with a scale (not shown specifically) with which the position of the bridge slide 5 in the direction denoted by the arrow x can be determined, and with a drive which can likewise not be seen and with which the bridge slide 5 can be moved.

During the measuring of the workpiece 25, for example with a tactile sensor 8, on contact of the workpiece 25 with the sensor 8, a signal is generated, via which the scale value of the scale of the spindle 7 in the z direction, of the scale of the cross slide 6 in the y direction and of the bridge slide 5 in the x direction are read out. The point of contact on the workpiece 25 is then determined from the scale values.

In order to activate the drives for the bridge slide 5, for the cross slide 6 and for the spindle 7, and also for reading the corresponding scale values of the respective scales and for evaluating the signals of the sensor 8, a controller (not illustrated here) is provided. This controller, in turn, is connected to a measuring computer which likewise cannot be seen and via which the operator of the coordinate measuring apparatus can input and change measurement sequences, and can also evaluate the measurement results.

The mechanism 24, which can also be seen in a perspective view laterally from below in FIG. 2, serves for moving the sensor 8 relative to the workpiece 25 in one or more coordinate directions (x, y, z). The mechanism 24 here includes a stiff frame 45 (for the sake of clarity, the reference number 45 has not been used in FIG. 1, but only in FIG. 2). The stiff frame 45 has the first horizontal longitudinal member 1a with the first horizontal guide 26a, and also a first vertical support 2a and a second vertical support 2c, wherein the first horizontal longitudinal member 1a is stiffly connected to the upper end of the first support 2a and to the upper end of the second vertical support 2c.

Furthermore, the stiff frame 45 has the second horizontal longitudinal member 1b with the second horizontal guide 26b, which is oriented parallel to and at a distance from the first horizontal guide, and also a third vertical support 2b and a fourth vertical support 2d, wherein the second horizontal longitudinal member 1b is stiffly connected to the upper end of the third support 2b and to the upper end of the fourth vertical support 2d.

In addition, the stiff frame 45 (rigid frame) additionally has a first cross member 3a (first transverse member) which is oriented transversely with respect to the longitudinal direction of the first horizontal longitudinal member 1a and of the second horizontal longitudinal member 1b and to which the lower end of the first vertical support 2a and the lower end of the third vertical support 2b is stiffly connected, and a second cross member 3b (second transverse member) which is oriented transversely with respect to the longitudinal direction of the first horizontal longitudinal member 1a and of the second horizontal longitudinal member 1b and to which the lower end of the second vertical support 2c and the lower end of the fourth vertical support 2d are stiffly connected. This gives rise to the stiff frame 45 (rigid frame) which can be seen particularly readily in FIG. 2.

In addition to the stiff frame 45 (rigid frame), the mechanism 24 additionally has three underpinnings 4a, 4b and 4c (the underpinning 4c can only be seen in FIG. 2 and is concealed in FIG. 1) which are stiff in the vertical direction. The first cross member 3a of the stiff frame 45 is mounted on a first underpinning 4a which is stiff in the vertical direction. The second cross member 3b of the stiff frame 45 is mounted on the second underpinning 4b, which is stiff in the vertical direction, and on the third underpinning 4c, which is stiff in the vertical direction. The underpinnings 4a, 4b and 4c, which are stiff in the vertical direction, rest, in turn, on a substructure 10 (see FIG. 1) which therefore serves as a frame seat. In the embodiment shown here, the substructure 10, in turn, is arranged in a corresponding recess in the floor and is mounted here on the base surface of the recess via underpinnings 27a, 27b, 27c and 27d (the underpinning 27d cannot be seen in FIG. 1) which are resilient in the vertical direction and, at the same time, are also vibration-damping underpinnings. The underpinnings 27a to 27d here are plates which are produced from rubber and cork. In this embodiment, the frame seat (that is, the substructure 10) is mounted on the floor in a resilient and vibration-damped manner.

In addition, part of the mechanism 24 is at least also the bridge slide 5 (first measuring slide) which has already been described and is intended for moving the sensor 8 in a first horizontal coordinate direction, the sensor being guided along the first horizontal guide 26a and the second horizontal guide 26b. In addition, the cross slide 6 (second measuring slide) which is mounted movably horizontally along the bridge slide 5 (first measuring slide) in a second horizontal coordinate direction y, and the spindle 7 (third measuring slide) which is mounted movably in a third vertical coordinate direction z by the cross slide 6 (second measuring slide) and to the lower end of which the sensor 8 is then fastened, are optionally also part of the mechanism 24.

By contrast, the workpiece 25 is mounted on a workpiece seat which is designed here by way of example as a workpiece table 9 (see FIG. 1). Purely by way of example here, the workpiece table 9 is mounted via four underpinnings 11a, 11b, 11c and 11d, which are fitted in the corners, on the substructure 10 which, as described in the previous paragraph, also serves as a frame seat for the stiff frame 45. Only the underpinning 11a here can be seen because of the perspective. In the embodiment shown here, all four underpinnings 11a, 11b, 11c and 11d are stiff in the vertical direction. As already mentioned above, instead of this, it is, however, also possible, for example, for only three underpinnings which are stiff in the vertical direction to be used, or for three underpinnings which are stiff in the vertical direction to be used together with a fourth underpinning which is resilient in the vertical direction.

The workpiece seat, that is, here the workpiece table 9 with the underpinnings 11a, 11b, 11c and 11d, is therefore designed by this means in such a manner that the weight of the workpiece 25 is introduced directly into the substructure 10 (the frame seat), and therefore the workpiece seat is therefore designed in such a manner that the force flux of the weights of the workpiece is introduced directly into the frame seat. The weight of the workpiece is therefore in particular not absorbed by components of the stiff frame 45.

The following special characteristic arises by means of the described arrangement. Owing to the fact that the mechanism 24 for moving the sensor 8 relative to the workpiece 25 includes a stiff frame 45 which is mounted on the substructure 10 (the frame seat) via a three-point mounting with underpinnings 4a, 4b and 4c which are stiff in the vertical direction, it can be ensured that neither deformations of the floor on which the frame seat (here the substructure 10) is mounted nor deformations of the frame seat itself result in deformations of the mechanism 24.

After the workpiece seat introduces the force flux of the weights of the workpiece directly into the frame seat (that is, the substructure 10 here) and therefore introduces the weight of the workpiece directly into the floor, the workpiece weight itself can at most deform the substructure 10 (the frame seat) and/or the floor, but cannot deform the stiff frame 45 of the mechanism 24.

This leads to deformations of the frame seat (that is, here the substructure 10) because of a high workpiece weight only changing the position of the mechanism 24 relative to the workpiece 25. However, the mechanism 24 is not deformed by this means, and therefore measurement errors do not occur as a result.

Figure 3:
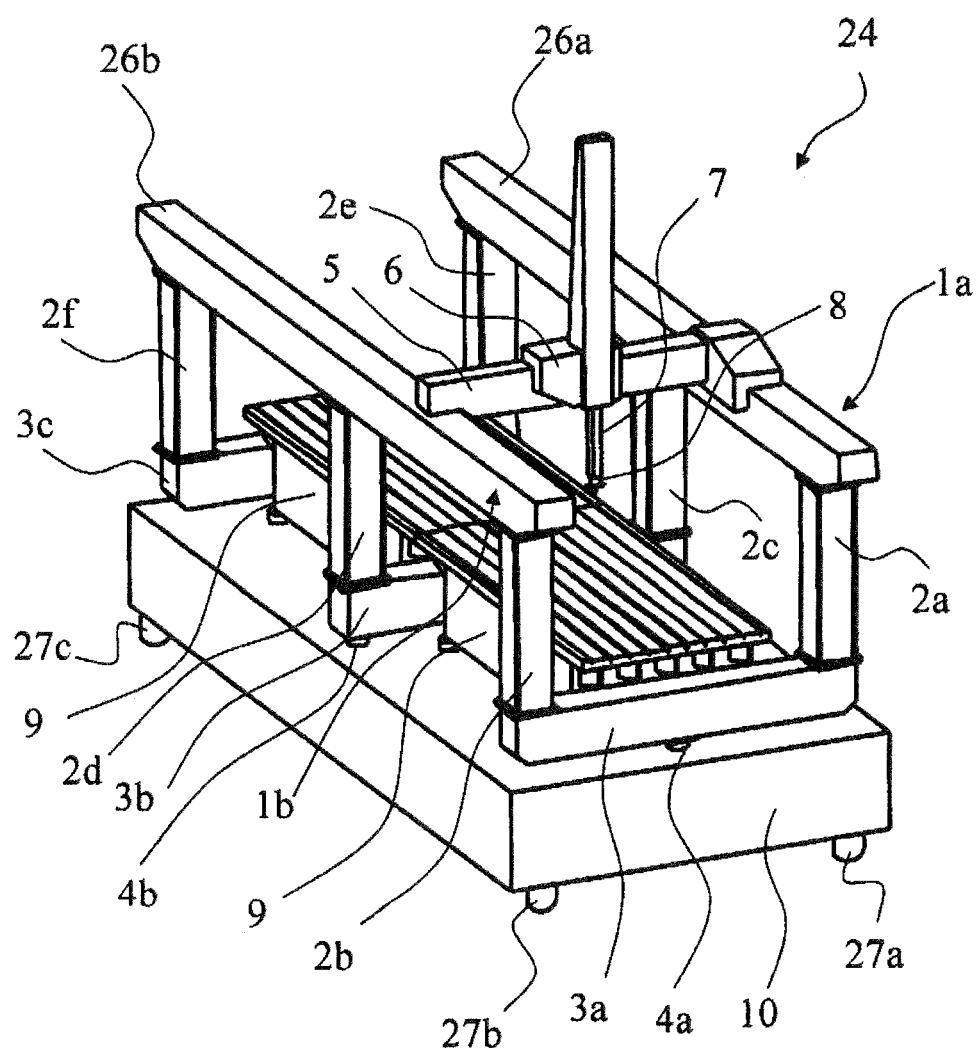
FIG. 3 shows the construction of a coordinate measuring apparatus according to the invention with longitudinal members 1a and 1b extended in relation to FIG. 1.
Figure 4:
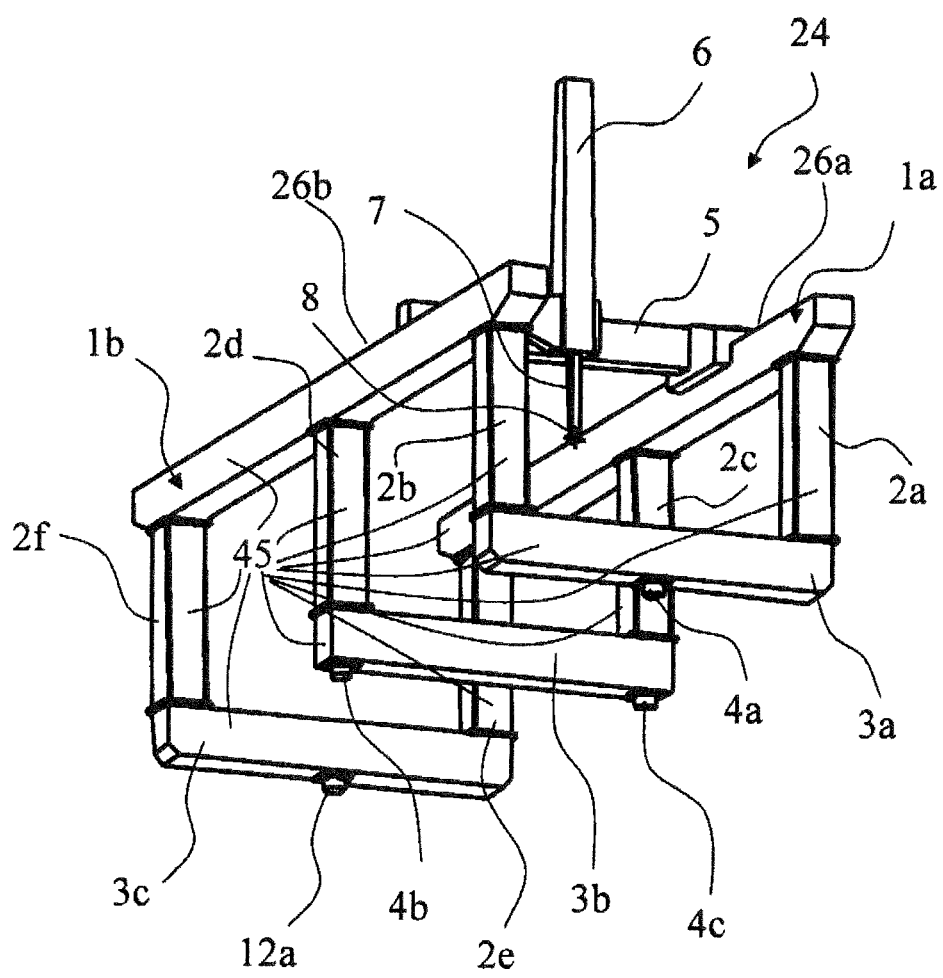
FIG. 4 shows a perspective view of the mechanism 24 for moving the sensor 8 out of the coordinate measuring apparatus shown in FIG. 3, with extended longitudinal members 1a and 1b.

FIG. 3 shows, purely by way of example, another coordinate measuring apparatus in which the invention is realized. FIG. 4 here shows some of the components which can be seen in FIG. 3, namely the mechanism 24 which is described in detail further below together with the sensor 8 fastened thereto, in a perspective view laterally from below.

The coordinate measuring apparatus will now be explained in more detail with reference to FIGS. 3 and 4. The coordinate measuring apparatus is constructed relatively similarly to the coordinate measuring apparatus according to FIGS. 1 and 2, with identical components (optionally somewhat differently dimensioned) being denoted by the same reference numbers as in FIGS. 1 and 2. The substantial difference of this coordinate measuring apparatus can be seen in the fact that the horizontal longitudinal members 1a and 1b, and consequently also the horizontal guides 26a and 26b, are longer than in the coordinate measuring apparatus according to FIGS. 1 and 2, and therefore both the first longitudinal member 1a is mounted on a further support 2e (fifth vertical support) and the second longitudinal member 1b is mounted on a further support 2f (sixth vertical support), and the supports 2e and 2f are mounted on an additional cross member 3c (third cross member). The upper end of the fifth vertical support 2e is again stiffly connected in this case to the first horizontal longitudinal member 1a, while the upper end of the sixth vertical support 2f is stiffly connected to the second horizontal longitudinal member 1b. The third cross member 3c, which is, of course, again oriented transversely with respect to the longitudinal direction of the first longitudinal member 1a and of the second longitudinal member 1b, is stiffly connected to the lower end of the fifth vertical support 2e and to the lower end of the sixth vertical support 2f. The reference number 45 for the stiff frame, which, in this exemplary embodiment, additionally includes the fifth vertical support 2e, the sixth vertical support 2f and the third cross member 3c, has only been provided in FIG. 4 for reasons of clarity.

In addition, the mounting of the mechanism here has at least one underpinning 12a (can only be seen in FIG. 4) which is resilient in the vertical direction and via which the third cross member 3c is mounted. As is apparent from FIG. 3, the underpinning 12a which is resilient in the vertical direction is likewise mounted on the frame seat (that is, here the substructure 10).

The mounting via a resilient underpinning 12a has the following background. Unlike the underpinnings 4a, 4b and 4c which are stiff in the vertical direction, each further underpinning has to be designed to be resilient. Otherwise, an upward or downward movement of the frame seat (here the substructure 10) would have the consequence that the force acting on the respective underpinning no longer remains substantially constant. During the downward movement of the frame seat (substructure 10) in the region of an underpinning, the underpinning, for example, could then hang in the air and no longer absorb any force. However, this would then lead to warping of the stiff frame 45 of the mechanism 24 and would therefore cause measurement errors, which is precisely what is intended to be avoided. Owing to the fact that the underpinning 12a is configured to be resilient, the force which is absorbed by the underpinnings remains substantially constant.

Unlike in the exemplary embodiment according to FIGS. 1 and 2, in the exemplary embodiment according to FIGS. 3 and 4, two measuring tables 9, which are each designed precisely in the same manner as the measuring table 9 from FIG. 1, are provided.

Figure 5:
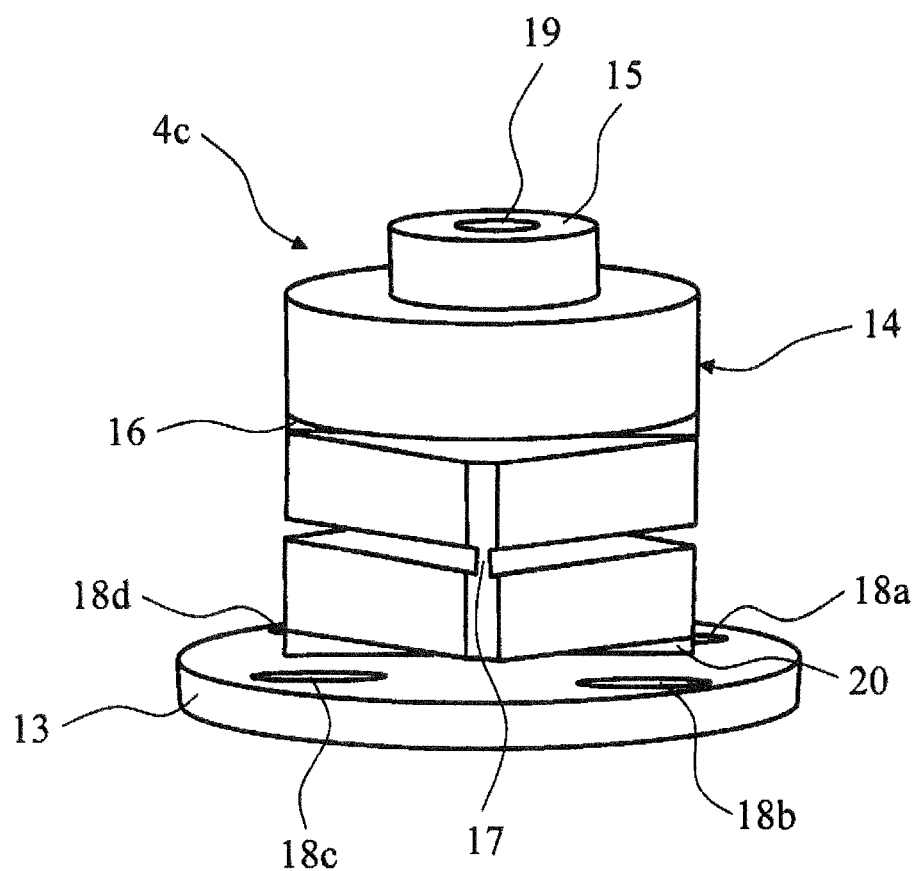
FIG. 5 shows a perspective view of a detail of the underpinning 4c, which is stiff in the vertical direction, from FIGS. 1 to 4, the underpinning being movable linearly and at the same time being tiltable in a horizontal direction and only being tiltable in a second horizontal direction.

The underpinning 4c, which is stiff in the vertical direction, from FIGS. 1, 2, 3 and 4 can be seen in FIGS. 5 to 7. FIG. 5 shows a perspective view of the underpinning 4c, while FIG. 6 shows the front view, and FIG. 7 shows the side view. The underpinning has a base plate 13 with four elongated holes 18a, 18b, 18c and 18d which can be fastened to the frame seat (that is, to the substructure 10 in the case of FIGS. 1 to 4) via screws. The screw connection to the frame seat has the effect in particular that, by this means, the stiff frame 45 of the mechanism 24 cannot slip in the horizontal direction. In addition, it is thereby ensured that the stiff frame 45 of the mechanism 24 cannot tilt. This risk could exist, for example, because, in the exemplary embodiment according to FIGS. 1 and 2, the stiff frame 45 is mounted on the frame seat (substructure 10) only via a three-point mounting and, for example, the first cross member 3a, which can be seen in FIG. 1, is mounted only via the underpinning 4a arranged centrally. In the event of weights in the front left region or in the front right region of the stiff frame 45 from FIG. 1, for example as a consequence of an unfavorable adjustment of the measuring slides 5 and 6, the stiff frame 45 could then tilt via the underpinning 4a.

In addition, the underpinning shown in FIGS. 5 to 7 also has an end web 15 with a threaded bore 19 to which the second cross member 3b can be fastened via a screw.

In comparison to the underpinnings 4a and 4b which are likewise stiff in the vertical direction, the special characteristic of this underpinning 4c can be seen in the fact that the underpinning is movable linearly and is also tiltable in a horizontal direction and is only tiltable in a second horizontal direction. For this purpose, the underpinning 4c, which is manufactured monolithically here from a block of material, has material-weakened regions 16, 17 and 20 which act as leaf springs. As is apparent from FIG. 6, the material-weakened region 17 permits a tilting in a first horizontal direction. This is also indicated by the arrow 29. As can readily be seen from FIG. 7, the material-weakened regions 16 and 20 permit a linear movement and at the same time a tilting in a second horizontal direction which is perpendicular to the first horizontal direction. This is indicated by an arrow 30.

Figure 8:
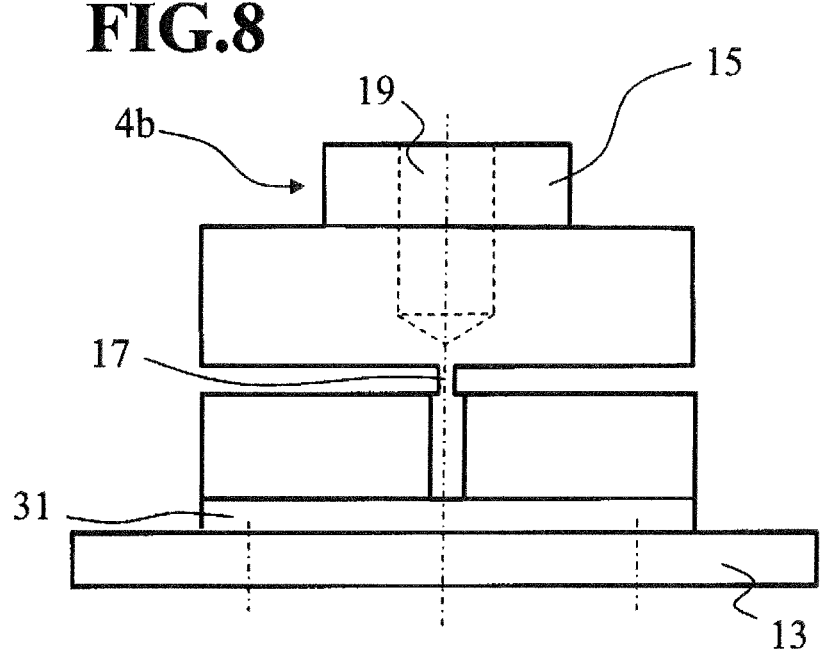
FIG. 8 shows a side view of the underpinning 4b, which is stiff in the vertical direction, from FIGS. 1 to 4, the underpinning only being tiltable in two horizontal directions.

The underpinning 4b which can be seen in FIGS. 1 to 4 and is stiff in the vertical direction can be seen in a side view in FIG. 8. Identical parts as in the case of the underpinning 4c according to FIGS. 5 to 7 have been denoted here by the same reference numbers. As can be seen from FIG. 8, the underpinning 4b has a material-weakened region 17, which only permits a tilting in a first horizontal direction, and a material-weakened region 31, which only permits a tilting in a second horizontal direction which is perpendicular to the first horizontal direction.

Figure 9:
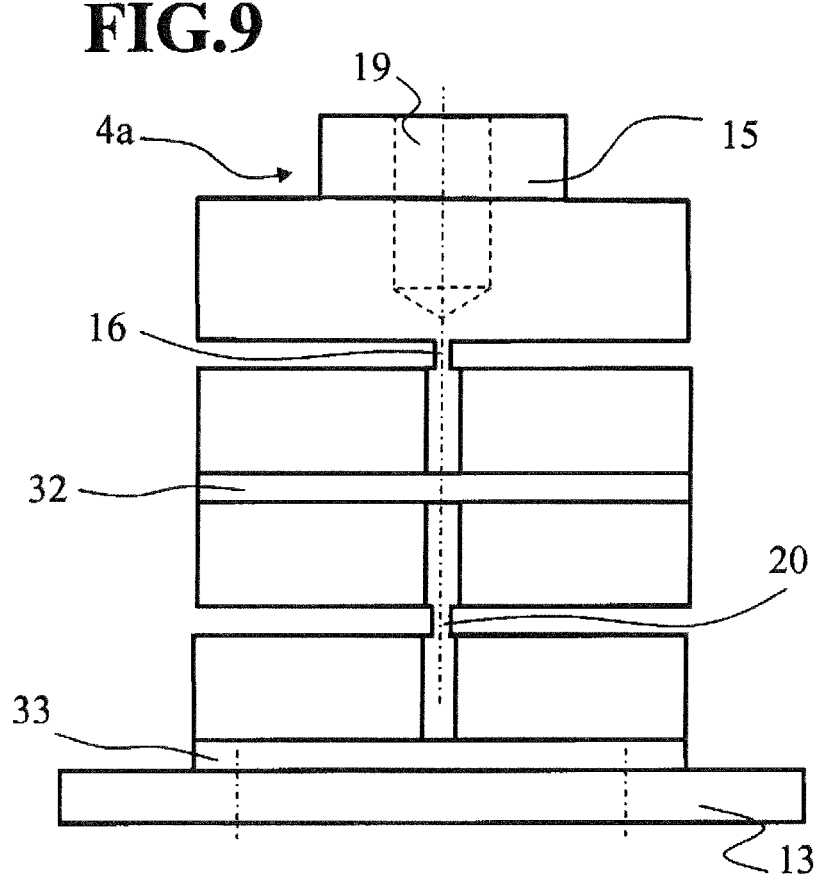
FIG. 9 shows a side view of the underpinning 4a, which is stiff in the vertical direction, from FIGS. 1 to 4, the underpinning being movable linearly and at the same time being tiltable in two horizontal directions.

The underpinning 4a which can be seen in FIGS. 1 to 4 and is stiff in the vertical direction can be seen in a side view in FIG. 9. The same parts as in the underpinning 4c according to FIGS. 5 to 7 have been denoted here by the same reference numbers. As can be seen from FIG. 9, the underpinning 4a firstly has two material-weakened regions 16 and 20 via which a linear movement and also a tilting in a first horizontal direction are made possible, and two material-weakened regions 32 and 33 via which a linear movement and a tilting in a second horizontal direction which is perpendicular to the first horizontal direction are made possible.

Figure 10:
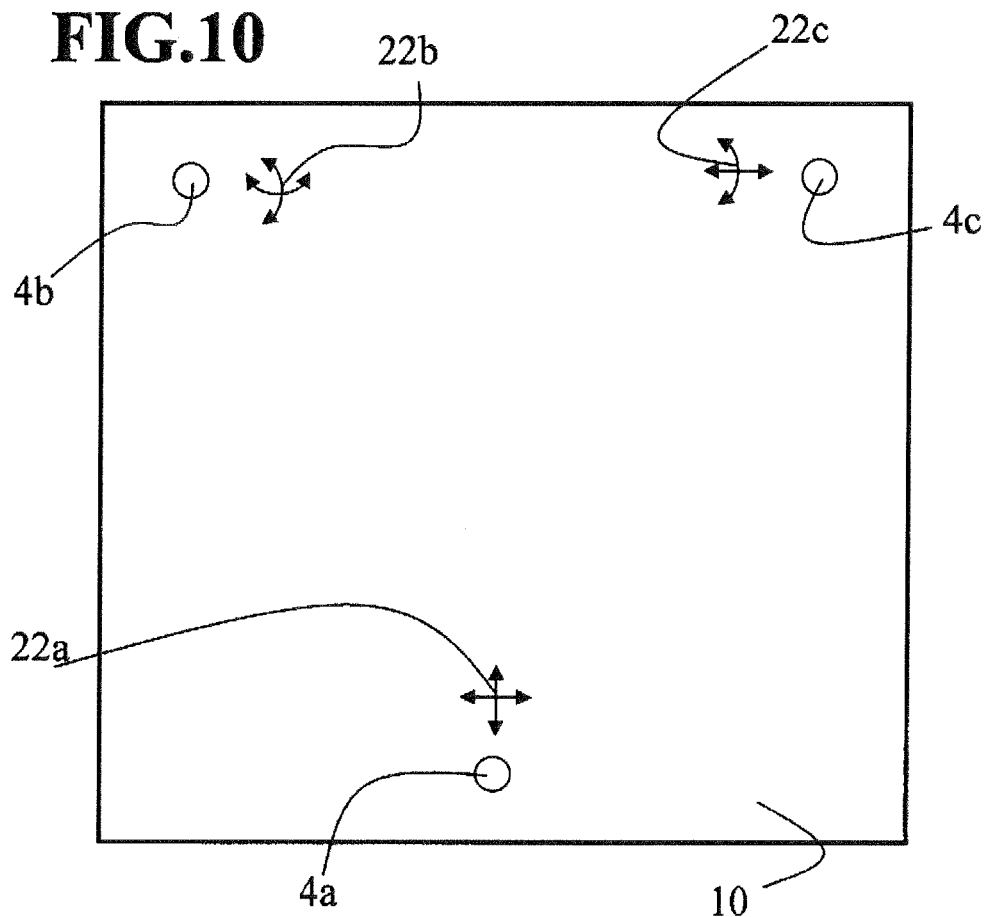
FIG. 10 shows a schematic illustration of the mounting of the stiff frame on the frame seat (substructure 10)

The effect of these three underpinnings 4a to 4c which are stiff in the vertical direction will now be explained with reference to FIG. 10. The frame seat (that is, the substructure 10 in the case of FIGS. 1 to 4) can be seen therein from above, and the three underpinnings 4a to 4c which are stiff in the vertical direction can be seen schematically on the frame seat. The arrows 22a to 22c are intended here to symbolize the movability of the three underpinnings 4a to 4c, wherein curved arrows are intended in each case only to symbolize a tilting in the relevant horizontal direction, and the straight arrows are intended to symbolize both linear movability and tilting in the respective horizontal direction. The effect which can be achieved by the linear movability of the underpinning 4c in the direction shown by the corresponding arrow 22c and by the linear movability of the underpinning 4a in the two horizontal directions shown by the arrow 22a is that thermally induced changes in length of the stiff frame 45 described in detail above, that is, for example, changes in length of the longitudinal member 1b (see FIGS. 1 to 4) or thermally induced changes in the length of the frame seat (that is, the substructure 10 in the event of FIGS. 1 to 4) can be compensated for. In addition to the thermal changes in length of the frame seat (substructure 10) or of the stiff frame 45, elevations or lowerings of the frame seat are also possible, however. In order to compensate therefor, each of the underpinnings 4a to 4c is tiltable in two horizontal directions. If one of the underpinnings 4a to 4c is already linearly movable in a horizontal direction, the tiltability in the relevant direction is in any case provided. If, by contrast, one underpinning is not intended to be linearly movable in a horizontal direction, the tiltability in this direction can be achieved by just a single material weakening, as is described in conjunction with the underpinnings 4c and 4b in FIGS. 5 to 8.

Figure 11:
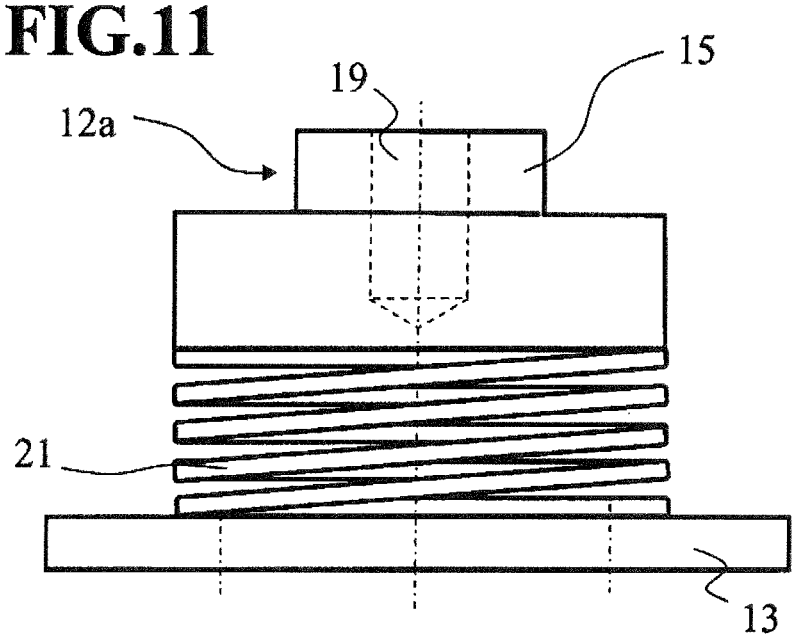
FIG. 11 shows a side view of the underpinning 12a, which is resilient in the vertical direction, from FIGS. 3 and 4.

FIG. 11 shows the underpinning 12a, which is resilient in the vertical direction, from the exemplary embodiment according to FIGS. 3 and 4. Identical components as in the underpinning from FIGS. 5 to 7 are also provided therein with the same reference numbers. The special characteristic of this underpinning 12a here is a very weak, prestressed spiral spring 21. Via the special underpinning 12a which is resilient in the vertical direction, the third cross member 3c from FIGS. 3 and 4 can now be mounted in a particularly suitable manner on the frame seat (substructure 10). Owing to the spiral spring 21, the underpinning is movable linearly and is tiltable in two horizontal directions and therefore, as already described above, can compensate for thermal changes in length of the stiff frame 45 or of the frame seat (substructure 10) or else lifting and lowering movements of the frame seat.

Figure 12:
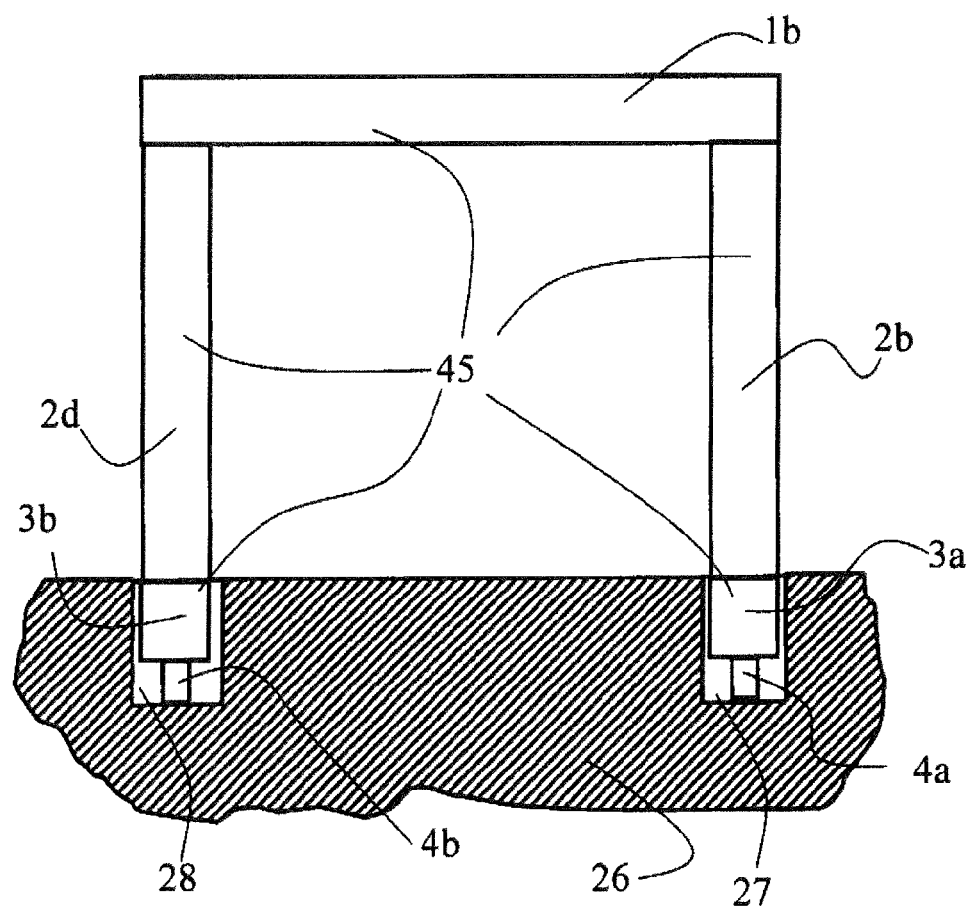
FIG. 12 shows a purely schematic sectional illustration of the stiff frame 45 from FIGS. 1 and 2, in which the cross members 3a and 3b are arranged in recesses 27 and 28 in the floor 26.

FIG. 12 shows, purely schematically, the stiff frame 45, which can be seen in FIGS. 1 and 2, of the mechanism 24, which frame is mounted here level with the floor. The same components as from FIGS. 1 and 2 have been denoted here with the same reference numbers. As can be seen from FIG. 12, the frame 45 in this case is not mounted on a substructure 10 but rather directly on the floor 26. In this case, the floor 26 includes recesses 27 and 28 in which the cross members 3a and 3b are mounted via the three underpinnings 4a, 4b and 4c (underpinning 4c cannot be seen here) which are stiff in the vertical direction. In order to see this, in FIG. 12 the floor 26 is only partially illustrated and is cut in such a manner that the recesses 27 and 28 are visible.

In the case of FIG. 12, the floor 26 therefore serves directly as the frame seat. At the same time, the floor 26 in the region of the stiff frame 45 also serves as a workpiece seat on which a workpiece which is to be measured can be mounted, and therefore the force of the weight of the workpiece is then introduced directly into the frame seat (that is, also the floor 26).

Owing to the fact that the cross members 3a and 3b are recessed in the floor, a measuring device which is level with the floor is also produced. If the recessed regions of the cross members 3a and 3b are covered with plates, the workpiece seat can be walked on or else traveled over on all four sides without obstruction by the operator of the coordinate measuring apparatus.

Figure 13:
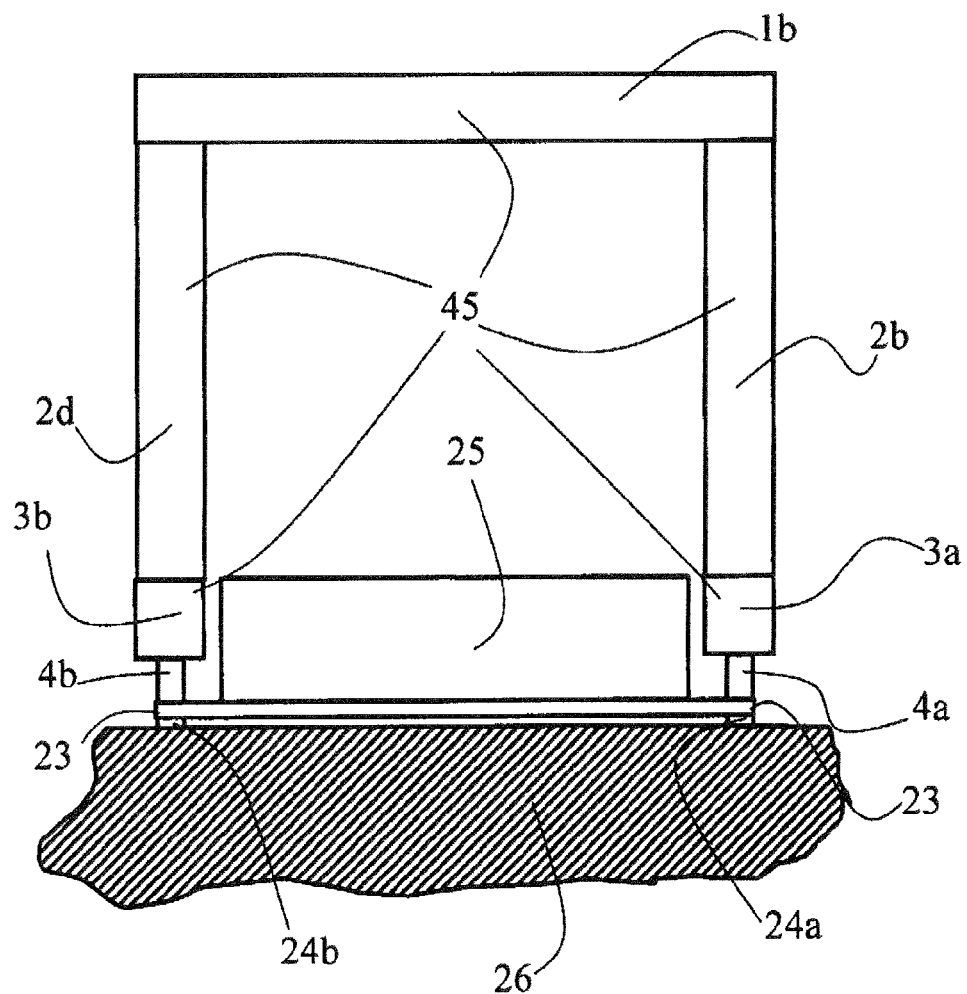
FIG. 13 shows a purely schematic side view of a stiff frame 45 from FIGS. 1 and 2, in which, unlike in FIG. 1, the frame seat is a framework 23 on which a measuring table 25 is directly mounted.

FIG. 13 shows, purely schematically, the stiff frame 45, which can be seen in FIGS. 1 and 2, of the mechanism 24 in an amended embodiment. The stiff frame 45 is mounted here on a frame seat which is designed as a framework 23. The same components as in the stiff frame 45 from FIGS. 1 and 2 have been denoted here with the same reference numbers. As can be seen from FIG. 13, in this case the stiff frame is mounted via the underpinnings 4a, 4b and 4c which are stiff in the vertical direction (underpinning 4c cannot be seen in FIG. 13) on a frame seat which is designed as a framework 23 in this exemplary embodiment. The framework is produced here from welded steel. A workpiece seat in the form of a measuring table 25 is arranged in turn on the frame seat (framework 23). It is thereby ensured in turn that the force flux of the weight of the workpiece is introduced directly into the frame seat (framework 23). The frame seat, that is, the framework 23 here, is mounted in turn via three underpinnings 24a, 24b and 24c which are resilient in the vertical direction (the underpinning 24c cannot be seen in FIG. 13) on the floor 26, only part of which is illustrated here and which is shown in section.

Figure 14:
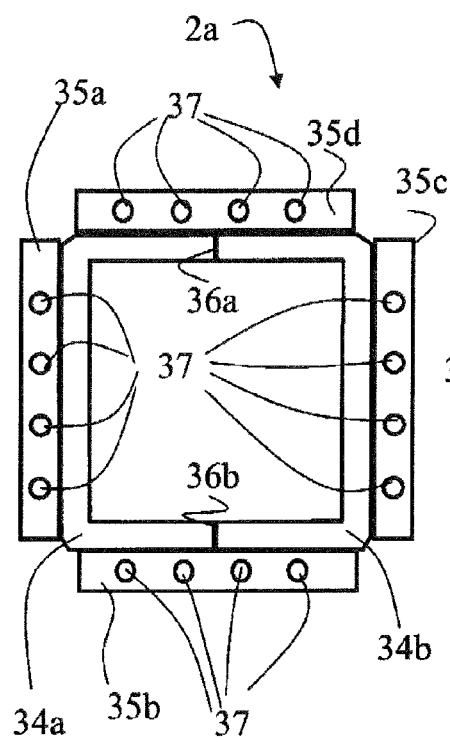
FIG. 14 shows a purely schematic illustration of the support 2a from FIG. 1 in top view; and, FIG. 15 shows a purely schematic illustration of the connection between the vertical support 2a and the longitudinal member 1a and the cross member 3a from FIG. 1.

FIG. 14 shows, purely schematically, the design of the support 2a (first vertical support), which can be seen in FIGS. 1 to 4, from above. As is apparent therefrom, the support 2a is produced from two steel plates 34a and 34b which are bent in a U-shaped manner and are welded over the entire length thereof by two weld seams 36a and 36b. Four plates 35a, 35b, 35c and 35d are welded to the upper end, wherein each of the plates has a multiplicity of bores 37. The same four plates with bores are welded to the lower end of the support 2a, wherein the plates can only be seen in FIG. 15 and are denoted by the reference numbers 35a', 35b', 35c' and 35d' in order to differentiate them from the plates welded to the upper end.

Figure 15:
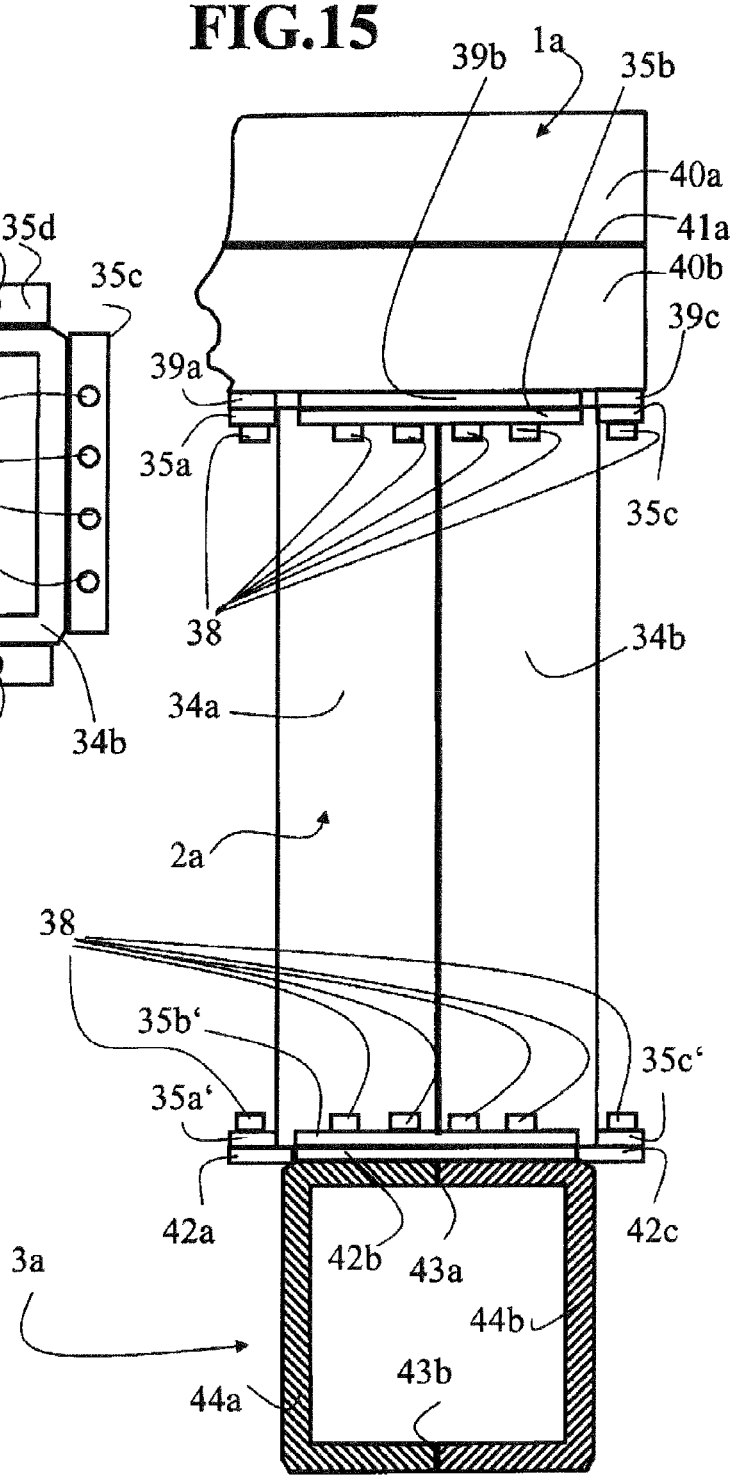

It can be seen from FIG. 15 how the support 2a which is shown in FIG. 14 is then stiffly connected to the horizontal longitudinal member 1a and to the cross member 3a. FIG. 15 shows here a purely schematic illustration of a section of the stiff frame 45, which is illustrated in FIG. 1, along line A A (see FIG. 1). As can be seen from this sectional illustration, the longitudinal member 1a (first horizontal longitudinal member) is stiffly connected to the upper end of this support 2a (first vertical support) and the cross member 3a (first cross member) is stiffly connected to the lower end. As can be seen from the broken edge on the left edge of the horizontal longitudinal member 1a, only a small part of the longitudinal member 1a is illustrated.

As can be seen from FIG. 15, the horizontal longitudinal member 1a is also configured as a hollow profile which, analogously to the support 2a as described in conjunction with FIG. 14, is welded together from two U-shaped steel plates 40a and 40b which are welded together. Only the one weld seam 41a of the two weld seams can be seen here. On the lower side of the longitudinal member 1a which can be seen, four plates 39a to 39d (plate 39d cannot be seen here) are welded on here corresponding to the plates 35a to 35d of the support 2a. Unlike for the plates 35a to 35d of the support 2a, threaded bores are provided in the four plates, and therefore the support 2a can be stiffly connected to the horizontal longitudinal member 1a by screws 38 being introduced through the bores 37 in the plates 35a to 35d of the support 2a and being screwed into the thread of the plates 39a to 39d. This results in an extremely stiff connection between the support 2a and the longitudinal member 1a.

The stiff connection of the support 2a at the lower end thereof to the cross member 3a also takes place in precisely the same manner. The cross member 3a is also configured as a hollow profile and is produced from two U-shaped steel plates 44a and 44b which are welded to each other over the entire length via two weld seams 43a and 43b. On the upper side of the cross member 3a, four plates 42a to 42d having threaded bores (plate 42d cannot be seen here) are welded on in the region of the four plates 35a' to 35d' of the support 2a. The support 2a is stiffly connected to the cross member 3a by screws 38 being introduced through the bores 37 of the plates 35a' to 35d' of the support 2a and being screwed into threads of the plates 42a to 42d. This also results in an extremely stiff connection between the support 2a and the cross member 3a.

The other supports 2b to 2f according to FIGS. 1 to 4 are stiffly connected here in a completely analogous manner to the longitudinal members 1a and 1b and to the cross members 3a to 3c.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for measuring a workpiece having a workpiece surface, the coordinate measuring apparatus comprising:

a sensor configured to capture the workpiece surface of said workpiece;

a mechanism configured to move said sensor in at least one coordinate direction (x, y, z) relative to the workpiece, said mechanism including a rigid frame, a mount, and a measuring skid;

said rigid frame including a first horizontal longitudinal member having a first horizontal guide, a second horizontal longitudinal member having a second horizontal guide;

said second horizontal guide being arranged parallel to and in a spaced relationship to said first horizontal guide;

said rigid frame further including at least a first vertical support, a second vertical support, a third vertical support and a fourth vertical support each having a respective upper end and a respective lower end;

said first horizontal longitudinal member being rigidly connected to said upper ends of said first and second vertical supports;

said second horizontal longitudinal member being rigidly connected to said upper ends of said third and fourth vertical supports;

said rigid frame further including a first and a second transverse member;

said first transverse member being oriented transverse to the longitudinal direction of said first horizontal longitudinal member and to the longitudinal direction of said second horizontal longitudinal member and being rigidly connected to said lower end of said first vertical support and to said lower end of said third vertical support;

said second transverse member being oriented transverse to the longitudinal direction of said first horizontal longitudinal member and the longitudinal direction of said second horizontal longitudinal member and being rigidly connected to said lower end of said second vertical support and said lower end of said fourth vertical support;

said first transverse member and said second transverse member of said rigid frame being spaced apart from one another and being supported via said mount on a frame support; and, said measuring skid being configured to move said sensor in a first horizontal coordinate direction (x) along said first horizontal guide and said second horizontal guide.

2. The coordinate measuring apparatus of claim 1, said mount comprising at least three underpinnings via which said first and second transverse members are mounted on said frame support.

3. The coordinate measuring apparatus of claim 2, wherein said frame support is one of a foundation, a ground base and a stand.

4. The coordinate measuring apparatus of claim 2, wherein:

said underpinnings include a first underpinning, a second underpinning and a third underpinning each of which are rigid in a vertical direction;

said first, second and third underpinnings being the only ones of said underpinnings which are rigid in the vertical direction;

said first transverse member is mounted on said first underpinning; and, said second transverse member is mounted on said second underpinning and said third underpinning.

5. The coordinate measuring apparatus of claim 2, wherein at least one of said underpinnings is configured to be resilient in a vertical direction.

6. The coordinate measuring apparatus of claim 1, wherein:
   said rigid frame further includes a fifth vertical support and a sixth vertical support each having respective upper and lower ends and a third transverse member;
   said first horizontal longitudinal member is rigidly connected to said fifth vertical support at the upper end thereof;
   said second horizontal longitudinal member is rigidly connected to said sixth vertical support at the upper end thereof;
   said third transverse member is oriented transverse to the longitudinal direction of said first longitudinal member and of said second longitudinal member and is rigidly connected to the respective lower ends of said fifth vertical support and of said sixth vertical support; and,
   said mount of said mechanism further includes a resilient underpinning configured to be resilient in the vertical direction; and,
   said third transverse member is supported via said resilient underpinning.

7. The coordinate measuring apparatus of claim 1, wherein said measuring skid is a first measuring skid; and, said apparatus further comprises:
   a second measuring skid supported on said first measuring skid in such a manner so as to be movable in a second horizontal coordinate direction (y);
   a third measuring skid having a lower end and being mounted via said second measuring skid in such a manner so as to be movable in a third vertical coordinate direction (z); and,
   said sensor being fixed on said lower end of said third measuring skid.

8. The coordinate measuring apparatus of claim 1, wherein at least one of said longitudinal members, said supports, and said transverse members is configured as a hollow profile.

9. The coordinate measuring apparatus of claim 8, wherein said hollow profile is formed from two U-shaped halves which are welded along the length thereof.

10. The coordinate measuring apparatus of claim 1, wherein the rigid connection between said vertical supports and said transverse members and/or the rigid connection between said vertical supports and said longitudinal members is provided by threaded fasteners or welds.

11. A coordinate measuring apparatus for measuring a workpiece having a workpiece surface, the coordinate measuring apparatus comprising:
   a sensor configured to capture the workpiece surface of said workpiece;
   a mechanism configured to move said sensor in at least one coordinate direction (x, y, z) relative to the workpiece, said mechanism including a rigid frame, a mount, and a measuring skid;
   said rigid frame including a first horizontal longitudinal member having a first horizontal guide, a second horizontal longitudinal member having a second horizontal guide;
   said second horizontal guide being arranged parallel to and in a spaced relationship to said first horizontal guide;
   said rigid frame further including at least a first vertical support, a second vertical support, a third vertical support and a fourth vertical support each having a respective upper end and a respective lower end;
   said first horizontal longitudinal member being rigidly connected to said upper ends of said first and second vertical supports;
   said second horizontal longitudinal member being rigidly connected to said upper ends of said third and fourth vertical supports;
   said rigid frame further including a first and a second transverse member;
   said first transverse member being oriented transverse to the longitudinal direction of said first longitudinal member and to the longitudinal direction of said second longitudinal member and being rigidly connected to said lower end of said first support and to said lower end of said third support;
   said second transverse member being oriented transverse to the longitudinal direction of said first longitudinal member and the longitudinal direction of said second longitudinal member and being rigidly connected to said lower end of said second support and said lower end of said fourth support;
   said first transverse member and said second transverse member of said rigid frame being supported via said mount; and,
   said measuring skid being configured to move said sensor in a first horizontal coordinate direction (x) along said first horizontal guide and said second horizontal guide;
   said mount including a frame support; and, at least three underpinnings via which said first and second transverse members are mounted on said frame support, wherein:
   said underpinnings include a first underpinning, a second underpinning and a third underpinning each of which are rigid in a vertical direction;
   said first, second and third underpinnings being the only ones of said underpinnings which are rigid in the vertical direction;
   said first transverse member is mounted on said first underpinning;
   said second transverse member is mounted on said second underpinning and said third underpinning; and,
   at least one of said first underpinning, second underpinning and third underpinning is movable in at least one horizontal direction.

12. The coordinate measuring apparatus of claim 11, wherein said one of said first, second and third underpinnings which is movable in at least one horizontal direction is made monolithically from a block of material and is configured to be movable as a result of a weakening of said material.

13. A coordinate measuring apparatus for measuring a workpiece having a workpiece surface, the coordinate measuring apparatus comprising:
   a sensor configured to capture the workpiece surface of said workpiece;
   a mechanism configured to move said sensor in at least one coordinate direction (x, y, z) relative to the workpiece, said mechanism including a rigid frame, a mount, and a measuring skid;
   said rigid frame including a first horizontal longitudinal member having a first horizontal guide, a second horizontal longitudinal member having a second horizontal guide;
   said second horizontal guide being arranged parallel to and in a spaced relationship to said first horizontal guide;

said rigid frame further including at least a first vertical support, a second vertical support, a third vertical support and a fourth vertical support each having a respective upper end and a respective lower end;
said first horizontal longitudinal member being rigidly connected to said upper ends of said first and second vertical supports;
said second horizontal longitudinal member being rigidly connected to said upper ends of said third and fourth vertical supports;
said rigid frame further including a first and a second transverse member;
said first transverse member being oriented transverse to the longitudinal direction of said first longitudinal member and to the longitudinal direction of said second longitudinal member and being rigidly connected to said lower end of said first support and to said lower end of said third support;
said second transverse member being oriented transverse to the longitudinal direction of said first longitudinal member and the longitudinal direction of said second longitudinal member and being rigidly connected to said lower end of said second support and said lower end of said fourth support;
said first transverse member and said second transverse member of said rigid frame being supported via said mount; and,
said measuring skid being configured to move said sensor in a first horizontal coordinate direction (x) along said first horizontal guide and said second horizontal guide;
said mount including a frame support; and, at least three underpinnings via which said first and second transverse members are mounted on said frame support, wherein:
said underpinnings include a first underpinning, a second underpinning and a third underpinning each of which are rigid in a vertical direction;
said first, second and third underpinnings being the only ones of said underpinnings which are rigid in the vertical direction;
said first transverse member is mounted on said first underpinning;
said second transverse member is mounted on said second underpinning and said third underpinning; and,
at least one of said first underpinning, second underpinning and third underpinning is linearly movable in at least one horizontal direction and pivotable in at least one horizontal direction.

14. A coordinate measuring apparatus for measuring a workpiece having a workpiece surface, the coordinate measuring apparatus comprising:
a sensor configured to capture the workpiece surface of said workpiece;
a mechanism configured to move said sensor in at least one coordinate direction (x, y, z) relative to the workpiece, said mechanism including a rigid frame, a mount, and a measuring skid;
said rigid frame including a first horizontal longitudinal member having a first horizontal guide, a second horizontal longitudinal member having a second horizontal guide;
said second horizontal guide being arranged parallel to and in a spaced relationship to said first horizontal guide;
said rigid frame further including at least a first vertical support, a second vertical support, a third vertical support and a fourth vertical support each having a respective upper end and a respective lower end;
said first horizontal longitudinal member being rigidly connected to said upper ends of said first and second vertical supports;
said second horizontal longitudinal member being rigidly connected to said upper ends of said third and fourth vertical supports;
said rigid frame further including a first and a second transverse member;
said first transverse member being oriented transverse to the longitudinal direction of said first longitudinal member and to the longitudinal direction of said second longitudinal member and being rigidly connected to said lower end of said first support and to said lower end of said third support;
said second transverse member being oriented transverse to the longitudinal direction of said first longitudinal member and the longitudinal direction of said second longitudinal member and being rigidly connected to said lower end of said second support and said lower end of said fourth support;
said first transverse member and said second transverse member of said rigid frame being supported via said mount; and,
said measuring skid being configured to move said sensor in a first horizontal coordinate direction (x) along said first horizontal guide and said second horizontal guide;
said mount including a frame support; and, at least three underpinnings via which said first and second transverse members are mounted on said frame support; and,
a workpiece seat configured to accommodate the workpiece which is to be measured positioned thereon and to introduce the force of the weight of the workpiece directly into the frame support.

15. The coordinate measuring apparatus of claim 14, wherein said workpiece seat is the ground itself and said ground is also said frame support.

16. The coordinate measuring apparatus of claim 14, wherein said workpiece seat is configured as a workpiece table mounted on said frame support.

17. A coordinate measuring apparatus for measuring a workpiece having a workpiece surface, the coordinate measuring apparatus comprising:
a sensor configured to capture the workpiece surface of said workpiece;
a mechanism configured to move said sensor in at least one coordinate direction (x, y, z) relative to the workpiece, said mechanism including a rigid frame, a mount, and a measuring skid;
said rigid frame including a first horizontal longitudinal member having a first horizontal guide, a second horizontal longitudinal member having a second horizontal guide;
said second horizontal guide being arranged parallel to and in a spaced relationship to said first horizontal guide;
said rigid frame further including at least a first vertical support, a second vertical support, a third vertical support and a fourth vertical support each having a respective upper end and a respective lower end;
said first horizontal longitudinal member being rigidly connected to said upper ends of said first and second vertical supports;

said second horizontal longitudinal member being rigidly connected to said upper ends of said third and fourth vertical supports;

said rigid frame further including a first and a second transverse member;

said first transverse member being oriented transverse to the longitudinal direction of said first longitudinal member and to the longitudinal direction of said second longitudinal member and being rigidly connected to said lower end of said first support and to said lower end of said third support;

said second transverse member being oriented transverse to the longitudinal direction of said first longitudinal member and the longitudinal direction of said second longitudinal member and being rigidly connected to said lower end of said second support and said lower end of said fourth support;

said first transverse member and said second transverse member of said rigid frame being supported via said mount; and, said measuring skid being configured to move said sensor in a first horizontal coordinate direction (x) along said first horizontal guide and said second horizontal guide; and, wherein said frame support is defined by a ground base and said ground base has a plurality of cutouts formed therein; and, said transverse members are mounted in said cutouts.

* * * * *